Feb. 7, 1967 B. M. LEEB ET AL 3,303,444

ELECTRON BEAM CONVERGENCE AND DEFLECTION APPARATUS

Filed July 16, 1964 2 Sheets-Sheet 1

INVENTORS
BERNARD M. LEEB
ROD BELICA
By: Wallenstein, Spangenberg, Hattis ATTORNEYS Feb. 7, 1967 B. M. LEEB ET AL 3,303,444

ELECTRON BEAM CONVERGENCE AND DEFLECTION APPARATUS

Filed July 16, 1964 2 Sheets-Sheet 2

INVENTORS
BERNARD M. LEEB
ROD BELICA

By Wallenstein, Spangenberg, Hattis
ATTORNEYS

United States Patent Office 3,303,444

Patented Feb. 7, 1967

3,303,444

ELECTRON BEAM CONVERGENCE AND DEFLECTION APPARATUS

Bernard M. Leeb, Highland Park, and Rod Belica, Chicago, Ill., assignors to Videocraft Manufacturing Co., Chicago, Ill., a corporation of Illinois Filed July 16, 1964, Ser. No. 383,132

5 Claims. (Cl. 335—212)

The present invention relates to apparatus for controlling the position of electron beams in cathode ray tubes used in television receivers. More particularly, the present invention relates to beam convergence apparatus for controlling the deflections of the various electron beams used in color television tubes and the like to converge the beams onto a limited portion of a luminescent screen on the tube face and to purity ring deflection apparatus for simultaneously adjusting the positions of all of the electron beams in the tube for obtaining proper centering of the converged beams.

As is well known, the conventional color television tube used today has three electron guns mounted in the neck of the tube, which electron guns direct electron beams at three equally spaced points longitudinally in the tube neck. The beams are deflected by a number of different beam deflection means on their way to the luminescent screen on the face of the television tube. The screen is provided with a multiplicity of groups of phosphor areas or spots, there being three such areas or spots in each group capable respectively of producing light of the different primary colors, blue, green and red, in response to electron impingement thereon. The intensity and deflection of the three electron beams of the television tube are controlled in such a way that the picture produced on the screen approximates fairly closely the form and color of the particular scene recorded by the picture taking equipment involved.

One of the beam deflection means mounted on the neck of a color television tube is a deflection yoke having both horizontal and vertical beam deflection coils for moving the three beams as a unit in both horizontal and vertical directions across the entire extent of the screen of the television tube. The present invention relates to other beam deflection means carried on the neck of the color television tube behind the deflection yoke, such means being sometimes referred to as beam convergence and purity ring apparatus.

The beam convergence apparatus generally comprises a number of independently adjustable magnetic means carried on a common frame, the adjustable magnetic means being respectively located adjacent one of the electron beams. Adjustment of the magnetic means varies the flux directed into the neck of the tube to vary the deflection of the associated electron beam. The adjustment is made so that the three beams are made to converge on the respective phosphor areas or spots of a selected group thereof. When the beams are of equal intensity and each beam impinges upon the particular phosphor area or spot of a group assigned to the particular beam involved, due to the additive effect of the primary colors on the region of the screen occupied by the group of phosphor areas or spots involved, the resultant color is white. This adjustment is made prior to the application of the sweep and picture forming signals to the signal input terminals of the color television tube. (These sweep signals cause the converged beams to sweep across the entire useful area of the tube screen and the picture forming signals vary the relative intensities of the various electron beams to produce the desired color at each region of the screen occupied by each group of phosphor areas or spots.)

One of the objects of the invention is to provide improved electron beam convergence apparatus where the adjusting means thereof can be more quickly, easily and accurately adjusted than prior apparatus of this type.

In accordance with one aspect of the invention, the convergence apparatus includes a magnet support frame assembly having a separate section or leg positioned to be opposite each electron beam, the inner ends of said sections forming an expandable hub portion readily mountable over the neck of the television tube. Each of the sections or legs of the support frame assembly most advantageously forms an enclosure with closely spaced, opposite axially facing outer walls defining a narrow radially extending compartment. Each compartment includes a core of magnetic material forming a magnetic path which directs magnetic flux into the television tube neck and a preferably permanent disc magnet mounted for rotation about its central transverse axis which extends radially of the support frame assembly. The disc magnet most advantageously projects beyond both of the enclosure walls formed by each section or leg of the frame assembly and preferably at a point near the outer end thereof, the projecting portions of the disc magnet being positioned to be grasped between the thumb and one of the fingers of the operator's hand and freely rotated about its central transverse axis. The disc has a pair of opposite circumferentially spaced poles which affect the flux going through the associated core to a degree depending upon the angular position of the disc magnet. The operator can simultaneously vary the angular position of the disc magnets associated with two of the sections or legs of the support frame assembly simultaneously since only one hand is required to adjust each disc magnet.

In accordance with another aspect of the invention, means are most advantageously provided for locking each disc magnet in its adjusted position in the form of an eccentric cam mounted for rotation preferably about an axially extending axis (that is, an axis transverse to the axis of rotation for the disc magnet) adjacent the outer face of the associated disc magnet. The cam is preferably provided with a handle projecting from the outer end of the associated frame assembly section or leg to be grasped for turning between a locking position, where the cam by a wedging action prevents the associated disc magnet from rotating, and a release position, where the disc magnet can be freely turned. A pressure plate is preferably sandwiched between the end face of the cam and the adjacent face of the disc magnet, the pressure plate being held against movement parallel to the adjacent face of the disc magnet so as to prevent rotation of the disc magnet by the scraping action of the cam against the pressure plate as the cam is brought into its locking position.

The above mentioned and other objects, advantages and features of the invention will become apparent upon making reference to the specification to follow, the claims and the drawings wherein:

Figures 1, 2, 3, 4, 4A:
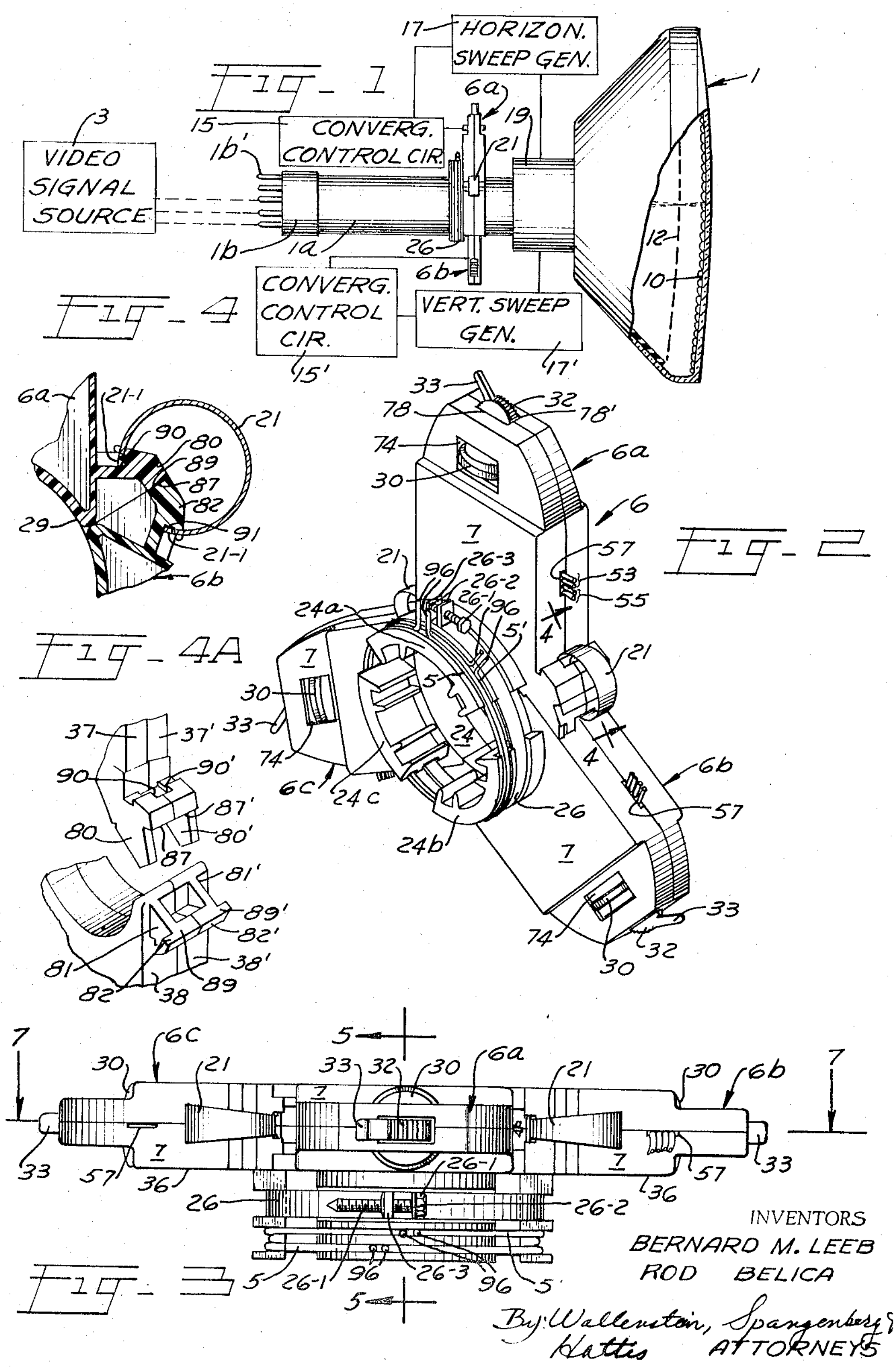
FIG. 1 is a side elevational view of a color television tube, partly broken away, with the various beam deflection means mounted on the neck thereof in accordance with the present invention and the various signal sources in block form which operate the tube shown.
FIG. 2 is a perspective view of a combined beam convergence and purity ring unit of the present invention forming part of the beam deflection means in FIG. 1.
FIG. 3 is an enlarged plan view of the apparatus shown in FIG. 2.
FIG. 4 is an enlarged fragmentary sectional view through the joint interconnecting two legs of the apparatus shown in FIG. 2, taken substantially along the lines 4—4 thereof.
FIG. 4A is an exploded view of the joint shown in FIG. 4.
Figures 5, 6, 7:
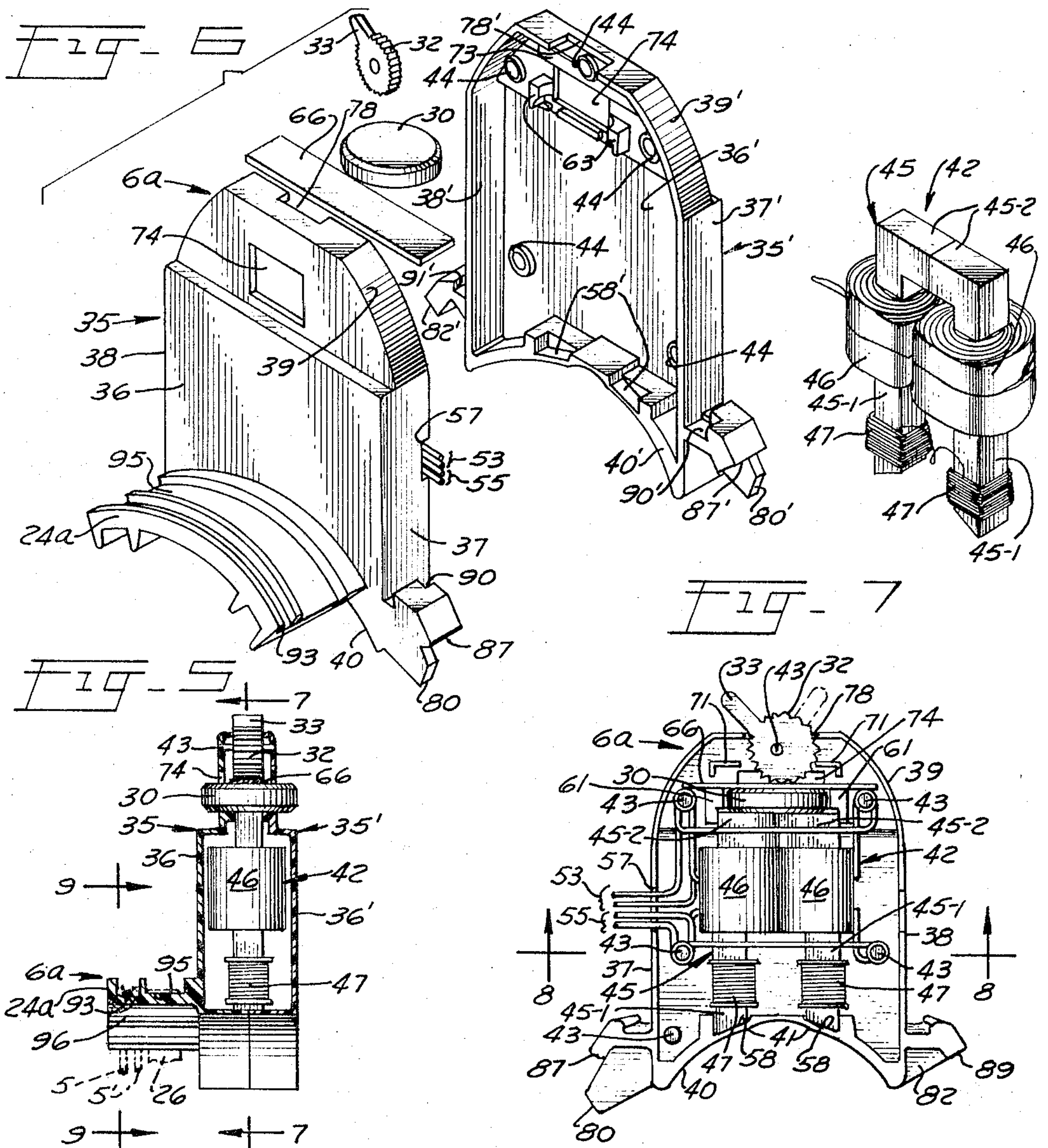
FIG. 5 is a fragmentary section through one of the legs of the apparatus shown in FIG. 3, taken substantially along the lines 5—5 therein.
FIG. 6 is an exploded view of the apparatus of FIG. 5.
FIG. 7 is a vertical sectional view of the apparatus shown in FIG. 5, taken substantially along the lines 7—7 thereof.
Figure 8:
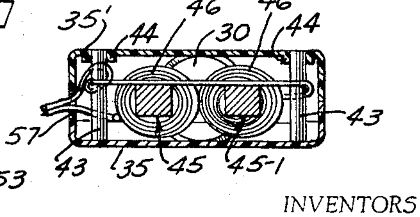
FIG. 8 is a transverse sectional view of the apparatus shown in FIG. 7, taken substantially along the lines 8—8 thereof.
Figure 9:
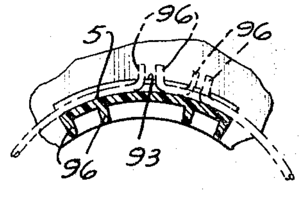
FIG. 9 is a transverse sectional view through the apparatus of FIG. 5, taken substantially along the lines 9—9 therein.

Reference should now be made to the drawings, more particularly to FIG. 1, where a color television tube 1 is shown. The color television tube is a conventional one having three electron guns (not shown) mounted in the end of the neck 1*a* of the tube so as to direct three electron beams spaced 120 degrees apart longitudinally. Control electrodes (not shown) associated with the electron guns are located within the neck of the tube for varying the intensity of the respective beams. The neck 1*a* of the tube terminates in a terminal cap 1*b* having terminals 1*b'* to which various voltage sources are connected including a filament voltage source (not shown) for heating the filaments of the electron guns, and a video signal source 3 which is coupled to the control electrodes associated with the electron guns. The video signal source 3 may comprise the output of the video amplifier of a home television receiver or a color television camera in the event the television tube is employed as a monitor. As above indicated, the video signals control the intensity of the three electron beams directed longitudinally through the neck 1*a* of the tube.

The three beams are acted upon by a number of beam deflection means mounted around the outside of the neck 1*a* of the color television tube. These beam deflection means include a pair of purity rings 5–5' to be described, which, upon rotation thereof, varies the deflection of the three electron beams simultaneously. The beams are also deflected by convergence magnet means generally indicated by reference numeral 6, including three angularly spaced magnets containing sections or legs 6*a*, 6*b* and 6*c*, each of which respectively controls the deflection of one of the beams. Each of the legs includes an enclosure or housing 7 constructed in a manner to be more fully described hereinafter. Adjustable convergence magnet beams to be described and housed in each enclosure produce a magnetic flux which is directed generally radially into the tube neck 1*a* where it affects only the associated beam. The convergence magnet means of the legs 6*a*, 6*b* and 6*c* are adjusted so that the three beams are converged upon one group of phosphor spots on a luminescent screen 10, each beam strikes a different spot of the group. This adjustment affects the static or fixed component of the magnetic flux produced by each leg of the convergence apparatus. The screen 10 is provided with a multiplicity of such groups of phosphor spots and the spots in each group respectively produce the three primary colors (blue, green and red) when they are struck by an electron beam. The region encompassed by the phosphor areas or spots in each group is so small that the eye sees only a color which is the resultant of the individual primary colors produced by the three phosphor spots. Thus, if the three electron beams striking the three spots in a group thereof are of equal intensity, the resulting color will be white. This adjustment of the convergence magnet means can be made with the beams striking any group of phosphor spots on the screen 10. The purity rings 5–5' are adjusted to bring the properly converged beams to the center of the screen 10. A masking electrode 12 is mounted behind the screen 10 to ensure that only certain areas of the screen will be struck by the electron beams involved.

Each of the convergence magnets means referred to includes in addition to a means for providing a static magnetic flux, a means for varying dynamically the magnitude of the magnetic flux produced by the magnet means. The dynamic magnetic field strength variations are made in accordance with a predetermined function of the beam deflection. The signals for producing the dynamic variation in the magnetic field strength are commonly derived from convergence control circuits 15 and 15' in FIG. 1 which circuits are coupled to horizontal and vertical deflection generator circuits 17 and 17'. The circuits 15, 15', 17, and 17' form no part of the present invention and will not be described in the specification. Reference, for example, can be made to U.S. Patent No. 2,880,364 and other literature which describe in detail the circuits 15, 15', 17, and 17' and the function performed thereby.

Also mounted on the neck of the color television tube is a conventional deflection yoke 19 which contains horizontally and vertically oriented coils fed with current from the circuits 17 and 17' in a conventional manner to cause the three electron beams as a unit to scan substantially the entire area of the screen 10.

The radially extending legs 6*a*, 6*b* and 6*c* form at the inner ends thereof a hub portion 24 which fits around the neck 1*a* of the tube 1 and is expandable against the resilient force of springs 21 to permit the hub portion to fit readily over the neck 1*a*. Although the hub portion 24 fits snugly around the neck 1*a* of the tube 1, vibration and jarring forces which frequently occur during the handling and shipping of the television receiver including the tube 1 can cause small but significant shifting of the convergence apparatus on the neck 1*a* of the tube which changes the color balance of the picture produced on the screen 10.

In accordance with one feature of the present invention, the inner ends of the legs 6*a*, 6*b* and 6*c* are provided with axially projecting jaw portions 24*a*, 24*b* and 24*c* which form a support for a clamping ring 26 and the purity rings 5–5'. The purity rings 5–5' and the convergence magnet means thus are formed into an integral unit which, unlike the previous arrangement of the purity rings and convergence magnet means, are maintained in a fixed predetermined axial relationship at all times. The clamping ring 26 has an adjusting screw 26–1 for varying the diameter of the clamping ring 26. The axially projecting jaw portions 24*a*, 24*b* and 24*c* are resilient and flexible and thus can be readily contracted to grip the tube neck 1*a* tightly by tightening the screw 26–1 of the clamping ring 26 so that the support frame assembly on which the purity rings and convergence apparatus are mounted cannot shift about under the vibration and jarring forces applied thereto during the shipment of the television receiver between the manufacturer, retailer and customer.

The purity rings and convergence apparatus on the tube neck would be of little value if the purity rings and convergence apparatus shifted about on the support frame assembly. Thus, these components must be both easy to adjust and securely lockable on the support frame assembly. The means for adjusting the static component of the magnetic flux produced by the convergence magnetic means of the legs 6*a*, 6*b* and 6*c* of the support frame assembly most preferably comprise disc magnets 30 mounted for rotation on radial axes within the respective enclosures 7 of the legs 6*a*, 6*b* and 6*c*. Each disc magnet projects beyond the outer axially facing surfaces of the associated enclosure and is positioned so that it can be readily grasped between the thumb and one of the other fingers of the operator's hand and turned to a desirable angular position. Since only one hand is required for this purpose, two of the disc magnets 30 can be simultaneously adjusted. The resistance offered to the turning of a disc magnet is sufficiently great that the disc magnet remains in any adjusted position in the absence of any severe jarring forces and is sufficiently small that it will not hinder the movement thereof required for the critical convergence adjustment.

The disc magnets are securely locked in place by eccentric cam discs 32 respectively mounted for rotation about axially extending axes. The cam discs are most advantageously located at the ends of the frame assembly enclosures 7 and are provided with operating handles 33 projecting beyond the ends of the enclosures 7 where they each readily can be grasped to turn the associated cam disc between a disc adjusting position where the associated disc magnet is free to rotate and a disc locking position where the disc magnet is firmly wedged in place.

The general features of the combined electron beam convergence and purity ring unit of the present invention have just been described. The details of the construction and arrangement of the various components will now be explained. It should be understood, however, that the broad aspects of the invention are not limited to these specific details, although some of them constitute specific aspects of the invention.

The support frame assembly enclosures 7 of the legs *6a*, *6b*, and *6c* are identical sub-assemblies like that shown in FIGS. 5 through 8 and so only one of them will be described in detail. Each of the enclosures comprises a pair of complementary enclosure sections 35–35′ having outer vertical walls 36–36′ and peripheral transverse side walls 37–37′ and 38–38′ which are respectively interconnected by peripheral outer walls 39–39′ and peripheral inner walls 40–40′. The enclosure sections 35–35′ are most advantageously made of an inexpensive injection molded, flame resistant, thermoplastic material, such as Avisun No. 2356 manufactured by Avisun Corporation. The outer surface of the inner peripheral walls 40–40′ have a curvature which approximates that of the neck of the cathode ray tube 1 around which it is to be placed. This surface is provided with short axial ribs or points 41 which engage the tube neck.

The two enclosure sections 35–35′ together define a radially extending compartment for housing one of the magnet means generally indicated by reference numeral 42. The enclosure sections can be secured together in any suitable way, but, as illustrated, they are interconnected by distributed transverse pins 43 extending from the inner surface of one of the enclosure sections 35 and passing through correspondingly positioned openings 44 in the other enclosure sections 35′ within which the ends of the pins 43 are sealed by heating the thermoplastic material forming the pins.

Figure 10:
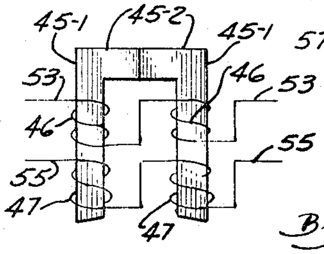
FIG. 10 is a schematic diagram of the windings which are wound around the core legs of one of the sections or legs of the apparatus illustrated in FIGS. 1 through 9.

The magnet means 42 mounted in each of the enclosure compartments include a core 45 having a pair of spaced parallel legs 45–1 and 45–1 and an interrupted bridging outer leg 45–2. As illustrated, the core 45 is comprised of L-shaped pieces of magnetic material positioned in spaced confronting relation to form the interrupted outer leg referred to above. The core 45 has two sets of windings 46–46 and 47–47 wound therearound. The set of windings 46–46 are wound around the inner ends of the core legs 45–1 and 45–1 and are connected in series as diagrammatically illustrated in FIG. 10. The other set of windings comprise windings 47–47 and are wound around the outer ends of the core legs 45–1 and 45–1 and are connected in series as illustrated in FIG. 10. The unconnected ends of the winding pairs 46–46 and 47–47 are respectively connected to pairs of conductors 53–53 and 55–55 which are looped (FIG. 7) around the pins 43 brought together and passed through an opening 57 in one of the side walls 37 of the enclosure section 35. The looping of the conductors 53–53 and 55–55 decouples pulling forces applied to these conductors from the thin wires making up the windings 46–46 and 47–47. As previously indicated, the windings 46–46 and 47–47 are fed with signals which effect dynamic flux variations which vary with the desired beam deflection.

The L-shaped core pieces and their windings are formed into an integral sub-assembly as by adhesively securing them together. Means are provided within each enclosure section 35 and 35′ for fixing the position of each core sub-assembly within the enclosure compartments. To this end, as illustrated, the inner peripheral walls 40—40 are provided with shallow recesses into which the ends of the core legs 45–1 and 45–1 extend. The recesses are formed by confronting openings 58–58′ formed in the inner peripheral walls 40–40′. Also, enclosure sections 35–35′ are provided with shoulder forming projections 61—61 and 63—63 which engage the outer corners of the core legs 45–1 and 45–1 to hold the same in position. The disc magnet 30 in each leg of the frame assembly is rotatably mounted between inwardly facing shoulder formed by the aforementioned shoulder-forming projections 61—61 and 63—63 in the enclosed sections 35–35′. The disc magnet 30 abuts against the outer surface of the core 45 and the outer surface thereof is engaged by an elongated pressure plate 66 which may be made of cardboard-like material which is prevented from moving longitudinally to any substantial extent by the contact thereof with the side walls of the associated enclosure sections 35–35′, as best indicated in FIG. 1. The pressure plate 66 fits into the space defined between the outer faces of the shoulder-forming projections 61—61 and 63—63, projections 71—71 on the enclosure section 35 and an elongated projection 73 on the enclosure sections 35′. When the enclosure sections 35 and 35′ are brought together into confronting relation, the edges of the various peripheral side walls thereof as well as the projections 61—61 and 63—63, 71—71 and 73 abut to provide a rigid enclosure.

The disc magnets 30 project through openings 74—74 in the outer walls 36 and 36′ of the enclosure sections 35–35′. As previously indicated, each of the disc magnets is releasably locked in place by an eccentric cam disc 32. Each cam disc is mounted for rotation about one of the pins 43 centered at the outer end of the associated enclosure. The handle 33 of the cam disc extends through an opening in the outer end of the associated enclosure formed by confronting open-sided recesses 78–78′ respectively formed in the outer walls 39–39′ of the associated enclosure sections 35–35′. The periphery of each cam disc is knurled, so that the cam disc bites into the associated pressure plate 66 and wedges the plate against the associated disc magnet.

The bottom portions of the peripheral side walls 37–37′ respectively terminate in mirror-image projections 80–80′ which fit within recesses 81–81′ in complementary guide-forming projections 82–82′ (FIG. 4A) extending from the adjacent leg of the support frame assembly. The guide-forming projections 82–82′ respectively project outwardly from the bottom portions of the peripheral side walls 38–38′ of the associated enclosure sections 35–35′. The complementary pairs of projections 80–80′ and 82–82′ have confronting outer edges which are in abutment, namely 87–87′ and 89–89′. The interfitting projections 80–80′ and 82–82′ permit the various legs of the frame assembly to be moved outward relative to one another in a radial direction against the restraining force of springs 21 which have legs 21–1 and 21–1 fitting within confronting recesses 90–90′ and 91–91′ in the projections 80–80′ and 82–82′ to urge the adjacent legs of the support frame assembly together.

The various jaw portions **24*a*, 24*b* and 24*c* are integrally molded with one of the enclosure sections 35. As perhaps best illustrated in FIGS. 2, 5 and 6, each jaw portion has in the outer surface thereof a pair of adjacent circular grooves 93 within which its purity rings 5–5′ are respectively rotatably supported, and a rectangular groove 95 in which the clamping ring 26** seats. The inner surface of each jaw portion has axially extending tapered conical surfaces which increase in size towards the outer end thereof.

The clamping ring 26 comprises a band of metal extending somewhat less than a full revolution, the ends of the band being turned out to form wings 26–2 and 26–2 through which passes the adjusting screw 26–1. A nut-forming insert member 26–3 fits around one of the wings 26–2 and threadedly receives the end of the screw 26–1 so that rotation of the latter in one direction will bring the wings 26–2 and 26–2 closer together to reduce the diameter of the band 26. The jaw portions 24*a*, 24*b* and 24*c* of each enclosure section 35 are sufficiently flexible that the tightening of the screw 26–1 will contract the band 26 tightly around the neck 1*a* of the tube 1.

The purity rings 5–5′ are each preferably made of an open-loop of circular cross-section, spring metal having outwardly turned wings 96 forming handles for rotating the purity rings. The purity rings are slipped in place within the jaw grooves 93 by merely separating the wings of the rings to enable the same to be snapped in place within the grooves 93. The purity rings may be magnetized in a conventional manner so that they have circumferentially spaced magnetic areas of opposite polarity.

The present invention has thus provided an extremely compact, inexpensive, easy to apply and to adjust combined convergence and purity ring deflection unit. It should be understood that numerous modifications may be made in the most preferred form of the invention described above without deviating from the broader aspects of the invention.

We claim:

1. Electron beam convergence apparatus for a cathode ray tube of the type having a plurality of electron guns at one end thereof for directing a number of spaced electron beams toward a screen at the other end of the tube, said apparatus comprising: a support frame assembly mountable over the neck of said tube and having a separate radially extending leg positioned to be opposite each one of the electron beams of said tube, a core on each leg forming a magnetic path which directs magnetic flux into the neck of said cathode ray tube, a disc magnet on each leg mounted opposite the associated core for rotation about its central transverse axis which extends generally radially of the frame assembly, each disc magnet having at least one exposed portion to be grasped for rotating the same about its central transverse axis, an eccentric cam disc mounted for rotation about an axially extending axis opposite said disc magnet, and an exposed handle on said cam disc to be grasped and turnable between a position where the cam disc holds said disc magnet against rotation and another position where it is released therefrom to enable the disc magnet to be freely turned.

2. Electron beam convergence apparatus for a cathode ray tube of the type having a plurality of electron guns at one end thereof for directing a number of spaced electron beams toward a screen at the other end of the tube, said apparatus comprising: a support frame assembly having a separate radially extending leg positioned to be opposite each one of the electron beams of said tube, said legs conjointly forming at the inner ends thereof a hub portion mountable over the neck of said tube, each of said legs forming a radially extending enclosure with closely spaced, opposite axially facing outer walls defining radially extending compartments, a core in each compartment forming a magnetic path which directs magbly, each disc magnet projecting beyond at least one magnet in each compartment mounted opposite the associated core for rotation about its central transverse axis which extends generally radially of the frame assembly, each disc magnet projecting beyond at least one of said outer walls of the associated enclosure at a point near the outer end thereof, the projecting portions of each disc magnet being adapted to be rotated about its central transverse axis, a pressure plate mounted against the outer face of each disc magnet, means holding each pressure plate against movement in an axial direction, an eccentric cam disc mounted for rotation about an axially extending axis opposite each pressure plate, and a handle on said cam disc extending beyond the outer end of the enclosure to be grasped and turnable between a position where the cam disc wedges against said pressure plate to hold said disc magnet against rotation and another position where it is released therefrom to enable the disc magnet to be freely turned.

3. Electron beam convergence apparatus for a cathode ray tube of the type having a plurality of electron guns at one end thereof for directing a number of spaced electron beams toward a screen at the other end of the tube, said apparatus comprising: a support frame assembly having a separate radially extending leg positioned to be opposite each one of the electron beams of said tube, said legs conjointly forming at the inner ends thereof a hub portion mountable over the neck of said tube, each of said legs forming a radially extending enclosure with closely spaced, opposite axially facing outer walls defining radially extending compartments, a core in each compartment forming a magnetic path which directs magnetic flux into the neck of said cathode ray tube, a disc magnet in each compartment mounted opposite the associated core for rotation about its central transverse axis which extends generally radially of the frame assembly, each disc magnet projecting beyond both of said outer walls of the associated enclosure at a point near the outer end thereof, the projecting portions of each disc magnet being adapted to be grasped between the thumb and one of the fingers of the operator's hand and rotated about its central transverse axis, a pressure plate mounted against the outer face of each disc magnet, means holding each pressure plate against movement in an axial direction, an eccentric cam disc mounted for rotation about an axially extending axis opposite each pressure plate, and a handle on said cam disc extending beyond the outer end of the enclosure to be grasped and turnable between a position where the cam disc wedges against said pressure plate to hold said disc magnet against rotation and another position where it is released therefrom to enable the disc magnet to be freely turned.

4. Electron beam convergence apparatus for a cathode ray tube of the type having a plurality of electron guns at one end thereof for directing a number of spaced electron beams toward a screen at the other end of the tube, said apparatus comprising: a magnet support frame having a separate leg positioned to be opposite each one of the electron beams of said tube, said legs conjointly forming at the inner ends thereof a hub portion mountable over the neck of said tube, each of said legs forming a radially extending enclosure with closely spaced, opposite axially facing, outer walls defining a radially extending compartment, each of said legs containing a core forming a magnetic path which directs magnetic flux radially into the neck of said tube, an adjustable magnet projecting from each compartment and positioned opposite the associated core, the magnitude of the flux passing through each core being dependent upon the adjusted position of the associated adjustable magnet, a cam in each compartment mounted for rotation opposite each adjustable magnet, and a handle for each cam projecting from each compartment to be grasped and turnable between a position where the cam holds the associated magnet against movement and another position where it is released therefrom to enable the magnet to be freely adjusted.

5. Electron beam convergence apparatus for a cathode ray tube of the type having a plurality of electron guns at one end thereof for directing a number of spaced electron beams toward a screen at the other end of the tube, said apparatus comprising: a magnet support frame having a separate radially extending leg positioned to be opposite each one of the electron beams of said tube, said legs conjointly forming at the inner ends thereof a hub portion mountable over the neck of said tube, each of said legs forming a radially extending enclosure with closely spaced, opposite axially facing outer walls defining a radially extending compartment containing a core forming a magnetic path which directs magnetic flux into the neck of said tube, an adjustable magnet in each compartment opposite the associated core and having a part thereof projecting outside of the associated enclosure where it can be grasped and adjusted in position, the magnitude of the flux passing through each of the cores being dependent upon the adjusted position of the associated adjustable magnet, a pressure plate positioned against one of the faces of each adjustable magnet, means holding each pressure plate against substantial movement relative to the associated magnet, a cam mounted for rotation opposite said pressure plate, and a handle for each cam extending outside of each enclosure to be grasped and turnable between a position where the cam wedges against said pressure plate to hold the associated magnet against movement and another position where it is released therefrom to enable the magnet to be freely adjusted.

References Cited by the Examiner

UNITED STATES PATENTS

| | | | |
|---|---|---|---|
| 2,513,929 | 7/1950 | Gethmann | 317—200 X |
| 2,864,021 | 12/1958 | Lazzery | 313—77 |
| 2,885,586 | 5/1959 | Mech. | |
| 2,897,390 | 7/1959 | Jensen. | |
| 3,020,434 | 2/1962 | Bloomsburgh | 313—76 |

BERNARD A. GILHEANY, *Primary Examiner.*

G. HARRIS, *Assistant Examiner.*